(12) United States Patent
Kim et al.

(10) Patent No.: US 12,266,032 B2
(45) Date of Patent: Apr. 1, 2025

(54) METHOD OF PROVIDING VIRTUAL INDOOR SPACE CONTENT AND SERVER THEREFOR

(71) Applicant: 3I INC., Daegu (KR)

(72) Inventors: Ken Kim, Seoul (KR); Ji Wuck Jung, Goyang-si (KR)

(73) Assignee: 3I INC., Daegu (KR)

( * ) Notice: Subject to any disclaimer, the term of this patent is extended or adjusted under 35 U.S.C. 154(b) by 358 days.

(21) Appl. No.: 17/878,180

(22) Filed: Aug. 1, 2022

(65) Prior Publication Data
US 2022/0383557 A1 Dec. 1, 2022

Related U.S. Application Data

(63) Continuation of application No. PCT/KR2021/012651, filed on Sep. 16, 2021.

(30) Foreign Application Priority Data

May 31, 2021 (KR) .................. 10-2021-0070117
May 31, 2021 (KR) .................. 10-2021-0070118

(51) Int. Cl.
*G06T 11/00* (2006.01)
*G06V 10/74* (2022.01)

(52) U.S. Cl.
CPC .............. *G06T 11/00* (2013.01); *G06V 10/74* (2022.01)

(58) Field of Classification Search
CPC ..... G06T 11/00; G06T 2200/24; G06T 7/246; G06T 7/30; G06T 11/60; G06T 19/00;
(Continued)

(56) References Cited

U.S. PATENT DOCUMENTS 7,126,630 B1    10/2006 Lee et al.
9,679,417 B1 *   6/2017 Ross .................. H04N 5/9305
(Continued)

FOREIGN PATENT DOCUMENTS

CN           1531826 A       9/2004
DE    10 2019 120 561 A1    2/2020
(Continued)

OTHER PUBLICATIONS

International Search Report issued on Feb. 18, 2022 in counterpart Patent Application No. PCT/KR2021/012651 (3 pages in Korean).

*Primary Examiner* — Samir A Ahmed
(74) *Attorney, Agent, or Firm* — NSIP Law

(57) ABSTRACT

A server is provided. The server provides virtual indoor space content corresponding to a real indoor space. The server includes a memory; a communication module; and at least one processor operatively connected to the memory and the communication module. The at least one processor may receive image data to generate the virtual indoor space content from a mobile terminal through the communication module, the image data including, for each of a plurality of indoor points, an omnidirectional image acquired from each indoor point and relative location information on the indoor point, and generate the virtual indoor space content by mapping a plurality of virtual points corresponding to the plurality of indoor points in a virtual indoor space based on the relative location information.

13 Claims, 15 Drawing Sheets

(58) Field of Classification Search
CPC ........ G06V 10/74; G06V 10/40; G06V 20/20; G01P 15/02; G06Q 5/10
See application file for complete search history.

(56) References Cited

U.S. PATENT DOCUMENTS

| | | |
|---|---|---|
| 10,102,656 B2 | 10/2018 | Lee et al. |
| 10,902,172 B2 | 1/2021 | Zweigle et al. |
| 2019/0035155 A1* | 1/2019 | Ikeda .................. G06T 7/0004 |
| 2020/0050727 A1 | 2/2020 | Zweigle et al. |
| 2020/0380195 A1 | 12/2020 | Zweigle et al. |

FOREIGN PATENT DOCUMENTS

| | | | |
|---|---|---|---|
| JP | 2004-531113 A | | 10/2004 |
| JP | 2014-002645 A | | 1/2014 |
| JP | 5915996 B2 | | 5/2016 |
| JP | 2018151997 A | * | 9/2018 |
| KR | 10-2003-0078903 A | | 10/2003 |
| KR | 10-0591144 B1 | | 6/2006 |
| KR | 10-0757751 B1 | | 9/2007 |
| KR | 101212231 B1 | * | 12/2012 |
| KR | 10-1583286 B1 | | 1/2016 |
| KR | 20190066892 A | * | 6/2019 |
| WO | WO 02/065786 A1 | | 8/2002 |
| WO | WO 2020/113273 A1 | | 6/2020 |

\* cited by examiner

METHOD OF PROVIDING VIRTUAL INDOOR SPACE CONTENT AND SERVER THEREFOR

CROSS-REFERENCE TO RELATED APPLICATIONS

This application is a PCT Continuation By-Pass application of PCT Application No. PCT/KR2021/012651 filed on Sep. 16, 2021, which claims the benefit under 35 USC § 119(a) of Korean Patent Application No. 10-2021-0070117 filed on May 31, 2021, and Korean Patent Application No. 10-2021-0070118 filed on May 31, 2021, in the Korean Intellectual Property Office, the entire disclosures of which are incorporated herein by reference for all purposes.

1. FIELD

The following description relates to a mobile terminal for generating virtual indoor space content, a method of providing virtual indoor space content using the same, and a server therefor.

2. DESCRIPTION OF RELATED ART

With the development of electronic technology, technologies for implementing various environments online are being developed. As part of such development, there is a virtualization technology for generating a virtual environment by virtualizing a real environment online.

In order to virtualize a real environment, it is important to generate a virtual environment using images of various angles acquired for the real environment, and to associate the generated virtual environment with a location at which the image is acquired.

In the case of an outdoor environment, information on an image acquisition location may be acquired using the Global Positioning System (GPS), etc., and thus location information may be easily acquired.

However, in the case of an indoor environment, there is a problem in that it is difficult to confirm an image capturing location, a movement path thereof, etc., indoors.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

An aspect of the present invention provides a server. The server is a server that provides virtual indoor space content corresponding to a real indoor space. The server may include a memory, a communication module, and at least one processor operatively connected to the memory and the communication module. The at least one processor may receive image data for generating the virtual indoor space content from a mobile terminal through the communication module, the image data including, for each of a plurality of indoor points, an omnidirectional image acquired from each indoor point and relative location information on the indoor point, and generate the virtual indoor space content by mapping a plurality of virtual points corresponding to the plurality of indoor points in a virtual indoor space based on the relative location information.

Another aspect of the present invention provides a method of providing virtual indoor space content performed in a server that services virtual indoor space content corresponding to a real indoor space. The method of providing virtual indoor space content may include receiving, from a mobile terminal, image data for generating virtual indoor space content corresponding to a real indoor space, the image data including, for each of a plurality of indoor points, an omnidirectional image acquired from each indoor point and relative location information on the indoor point, and generating the virtual indoor space content by mapping a plurality of virtual points corresponding to the plurality of indoor points in a virtual indoor space based on the relative location information.

Another technical aspect of the present invention provides a storage medium. The storage medium is a storage medium in which computer-readable instructions are stored. When the instructions are executed by a server, the instructions may allow the server to execute the operations of: receiving, from a mobile terminal, image data for generating virtual indoor space content corresponding to a real indoor space, the image data including, for each of a plurality of indoor points, an omnidirectional image acquired from each indoor point and relative location information on the indoor point; and generating the virtual indoor space content by mapping a plurality of virtual points corresponding to the plurality of indoor points in a virtual indoor space based on the relative location information.

A technical aspect of the present invention provides a mobile terminal. The mobile terminal is a mobile terminal for providing image data for generating virtual indoor space content corresponding to a real indoor space by linking to an omnidirectional camera that acquires an omnidirectional image. The mobile terminal may include a front camera generating a front image for a front of the mobile terminal, an inertial measurement sensor generating inertial sensing data according to movement of the mobile terminal, and at least one processor executing an application that generates relative location information on an indoor point where the omnidirectional image is acquired using a change in the front image and a variation of the inertial sensing data. The relative location information may include a relative movement path from a previous indoor point to the indoor point.

Another technical aspect of the present invention provides a method of controlling a mobile terminal. The method of controlling a mobile terminal is a method of controlling a mobile terminal performed in the mobile terminal that provides image data for generating virtual indoor space content corresponding to a real indoor space. The method may include requesting generation of an omnidirectional image for an indoor point included in the real indoor space, generating a front image for a front of the mobile terminal, generating inertial sensing data according to movement of the mobile terminal, and generating relative location information on the indoor point by using a change in the front image and a variation of the inertial sensing data. The relative location information may include a relative movement path from a previous indoor point to the indoor point.

Another technical aspect of the present invention provides a storage medium. The storage medium is a storage medium in which computer-readable instructions are stored. When the instructions are executed by a mobile terminal for providing image data for generating virtual indoor space content corresponding to a real indoor space by linking to an omnidirectional camera that acquires an omnidirectional image, the instructions may allow the mobile terminal to execute the operations of: requesting generation of an omnidirectional image for an indoor point included in the real indoor space; generating a front image for a front of the mobile terminal; generating inertial sensing data according to movement of the mobile terminal; and generating relative location information on the indoor point by using a change in the front image and a variation of the inertial sensing data, in which the relative location information may include a relative movement path from a previous indoor point to the indoor point.

The means for solving the above problems do not enumerate all the features of the present invention. Various units for solving the problems of the present disclosure may be understood in more detail with reference to specific embodiments of the following detailed description.

Other features and aspects will be apparent from the following detailed description, the drawings, and the claims.

DETAILED DESCRIPTION

Figure 1:
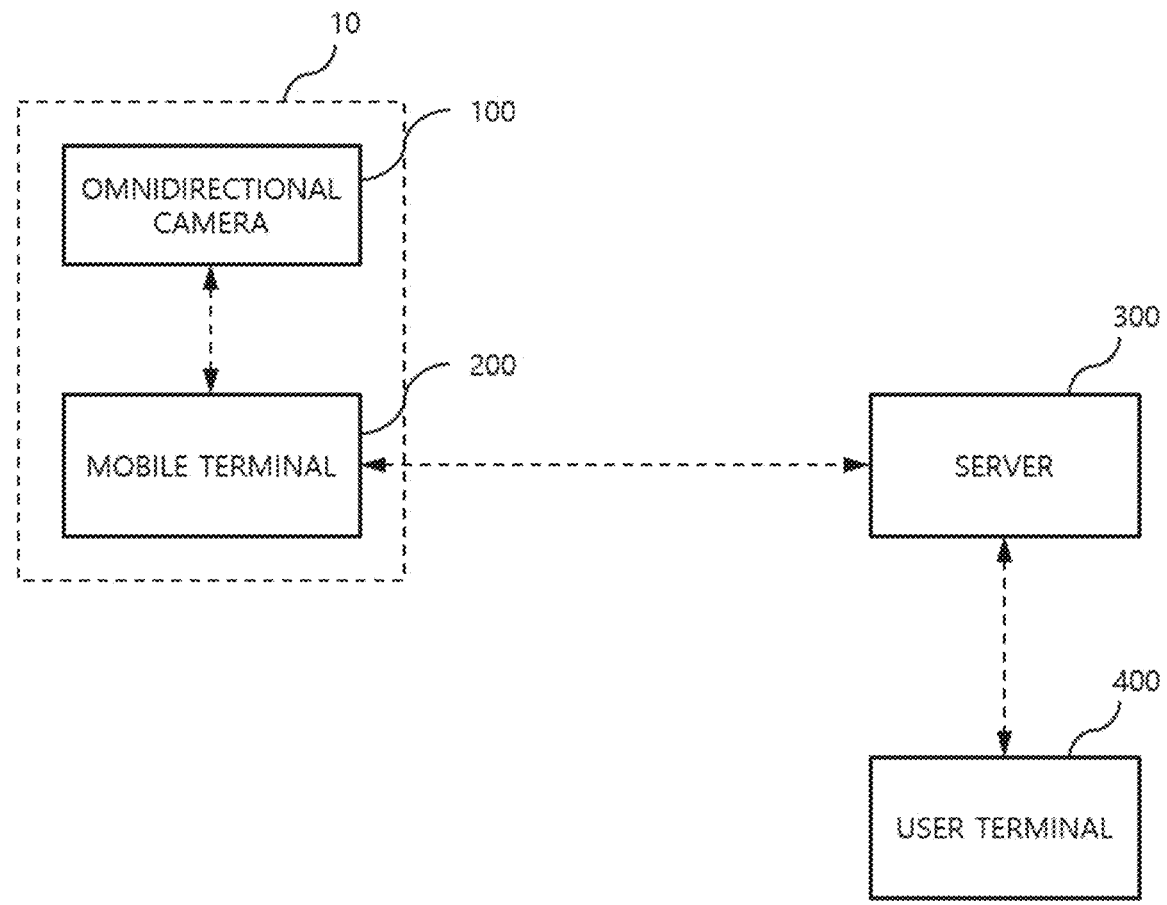
FIG. 1 is a diagram illustrating an example of a system for providing virtual indoor space content corresponding to a real indoor space, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The processors 810 and 910, memories 820 and 920, camera 930, storage device 940, input device 950, output device 960, network interface 970, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-9, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers. Additionally, the instructions or software and any associated data, data files, and data structures may be distributed (for example, downloaded or uploaded) through an application store (for example, PlayStore™) or may be directly distributed (for example, downloaded or uploaded) between two user devices (for example, smartphones) online. In a case of online distribution, at least some of the computer program products may be at least temporarily stored in a machine-readable storage medium such as a memory of a server of a manufacturer, a server of an application store, or a relay server or be temporarily created.

According to various embodiments, each component (for example, module or program) of the above-described components may include one entity or a plurality of entities. According to various embodiments, one or more components or operations among the above-described corresponding components may be omitted, or one or more other components or operations may be added. Alternatively or additionally, a plurality of components (for example, modules or programs) may be integrated into a single component. In this case, the integrated component may perform one or more functions of each component of the plurality of components in the same way as or similarly to that performed by the corresponding component among the plurality of components prior to the integration. According to various embodiments, operations performed by a module, a program, or another component may be executed sequentially, in parallel, repeatedly, or heuristically, or one or more of the operations may be executed in a different order or omitted, or one or more other operations may be added.

Although various flowcharts are disclosed to describe the embodiments of the present invention, this is for convenience of description of each step, and each step is not necessarily performed according to the order of the flowchart. That is, the steps in the flowchart may be performed simultaneously with each other, performed in the order according to the flowchart, or may be performed in an order opposite to the order in the flowchart.

The examples are directed to efficiently generating a location for an omnidirectional image captured in an indoor environment to generate virtual indoor space content for the indoor environment.

In accordance with one or more examples, it is possible to efficiently generate information on a location for an omnidirectional image captured in an indoor environment.

In accordance with one or more examples, it is possible to secure information on a capturing location and a movement path by generating relative movement information between locations captured in an indoor environment.

In accordance with one or more examples, it is possible to generate and provide virtual indoor space content for an indoor space.

FIG. 1 is a diagram illustrating an example of a system for providing virtual indoor space content corresponding to a real indoor space according to an embodiment disclosed in the present disclosure.

Referring to FIG. 1, the system may include an omnidirectional camera 100, a mobile terminal 200, and a server 300.

The omnidirectional camera 100 may capture an omnidirectional image centering on the omnidirectional camera 100.

The omnidirectional camera 100 may generate a plurality of images captured based on different angles, that is, a plurality of partial images, for generating an omnidirectional virtual image.

For example, the omnidirectional camera 100 may include four camera modules installed on each of front, rear, left and right surfaces, and may generate four partial images through each camera module. As another example, the omnidirectional camera device may generate four partial images by arranging a camera having a wide angle of 180 degrees or more on the front and back sides.

The omnidirectional camera 100 may be a separate device driven separately from the mobile terminal 200.

Alternatively, the omnidirectional camera 100 may be replaced with a function implemented using the mobile terminal 200. For example, by capturing a plurality of partial images using the mobile terminal 200, it is possible to provide a function of the omnidirectional camera 100.

Here, the omnidirectional virtual image is used to provide virtual indoor space content corresponding to a real indoor space, that is, the omnidirectional camera 100 performs capturing for the real indoor space.

The mobile terminal 200 may be connected to the omnidirectional camera 100 to receive a plurality of partial images (hereinafter referred to as omnidirectional images) for generating an omnidirectional virtual image from the omnidirectional camera 100.

The mobile terminal 200 may generate location information on a location where the omnidirectional image is acquired. Meanwhile, since the mobile terminal 200 and the omnidirectional camera 100 perform capturing in an indoor space, location information based on absolute coordinates, such as coordinates generated from the Global Positioning System (GPS), may not be acquired. Accordingly, the mobile terminal 200 generates relative location information. Here, the relative location information includes a relative movement path from an indoor point where a previous omnidirectional image is acquired to an indoor point where a current omnidirectional image is acquired.

In an embodiment, the omnidirectional camera 100 and the mobile terminal 200 may be implemented as one assembly 10. For example, the omnidirectional camera 100 and the mobile terminal 200 may be fixedly used on a cradle.

The mobile terminal 200 may provide an omnidirectional image and relative location information on the omnidirectional image to the server 300.

The mobile terminal 200 is a portable electronic device, and may include, for example, a mobile phone, a smart phone, a laptop computer, a digital broadcasting terminal, a personal digital assistant (PDA), a portable multimedia player (PMP), a navigator, a slate PC, a tablet PC, an ultrabook, a wearable device (for example, a watch-type terminal (smartwatch), a glass-type terminal (smart glass), or a head mounted display (HMD)), etc.

The server 300 generates an omnidirectional virtual image using the omnidirectional image, and maps a plurality of virtual points corresponding to a plurality of indoor points in the virtual indoor space based on relative location information to generate virtual indoor space content.

A user terminal 400 may receive the virtual indoor space content from the server 300.

Figure 2:
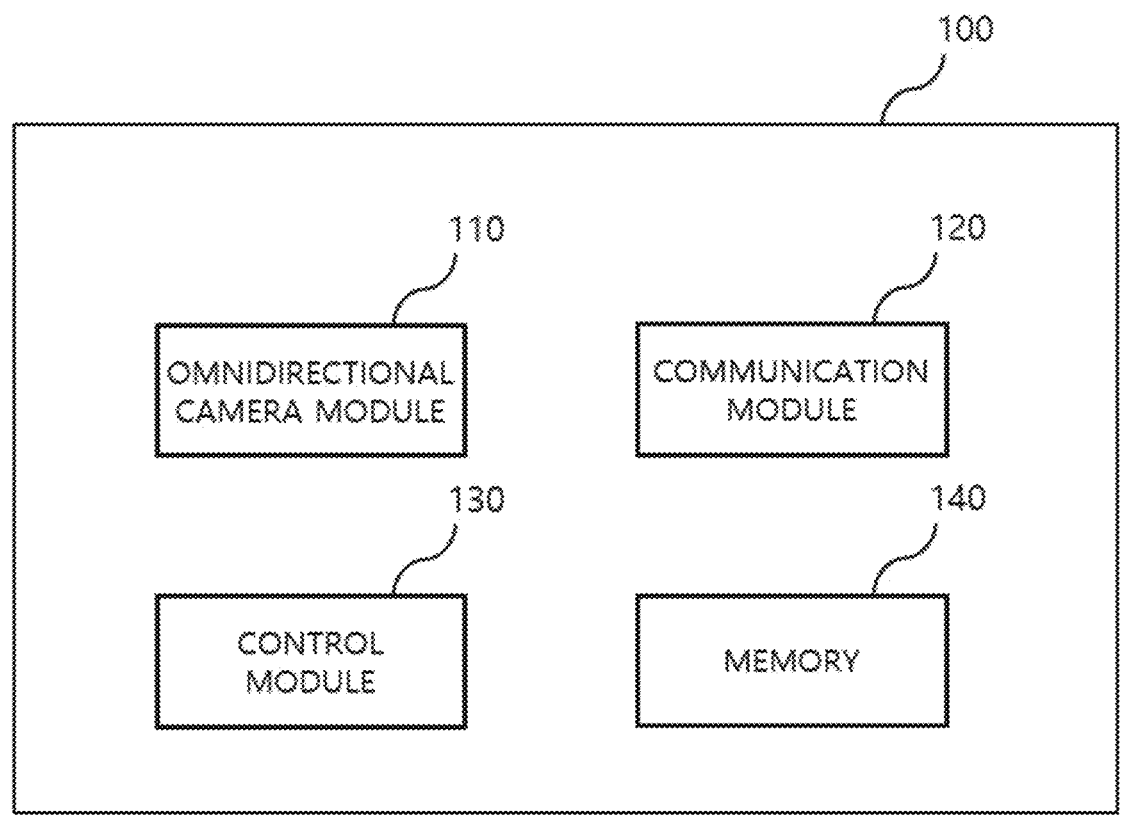
FIG. 2 is a block diagram for describing an omnidirectional camera, in accordance with one or more embodiments.

FIG. 2 is a block diagram illustrating an omnidirectional camera according to an embodiment disclosed in the present disclosure.

Referring to FIG. 2, the omnidirectional camera 100 may include an omnidirectional camera module 110, a communication module 120, a control module 130, and a memory 140.

The omnidirectional camera module 110 is a camera capable of generating an omnidirectional image, and may include, for example, a plurality of camera modules oriented at different angles.

The communication module 120 may establish a communication connection with the mobile terminal 200. For example, the communication module 120 may establish a communication connection with the mobile terminal 200 using at least one of a short-range wireless communication module such as Bluetooth or a wired communication module.

The control module 130 may control the omnidirectional camera module 110 or the communication module 120 by driving a program stored in the memory 240. For example, the control module 130 may control the omnidirectional camera module 110 to generate the omnidirectional image, and provide the generated omnidirectional image to the mobile terminal 200 through the communication module 120.

The memory 140 may store a program or an omnidirectional image, and may provide a memory space for driving the control module 130.

Figure 3:
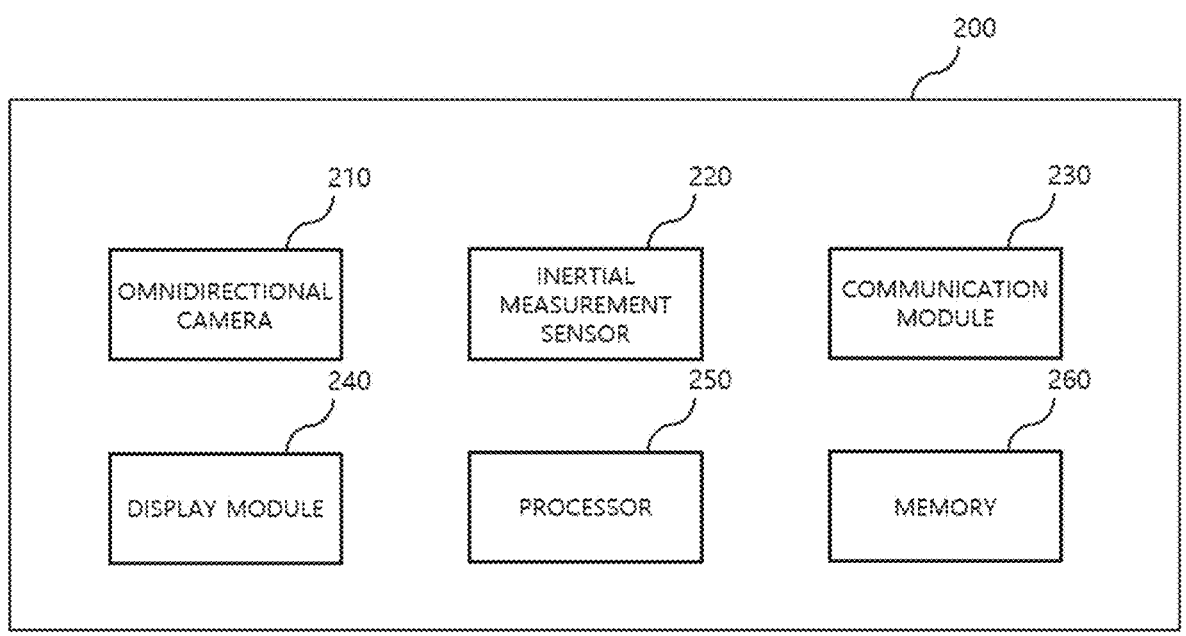
FIG. 3 is a block diagram for describing a mobile terminal, in accordance with one or more embodiments.

FIG. 3 is a block diagram for describing a mobile terminal according to an embodiment disclosed in the present disclosure.

Referring to FIG. 3, the mobile terminal 200 includes a front camera 210, an inertial measurement sensor 220, a communication module 230, a display module 240, a processor 250, and a memory 260.

Although not shown, the configuration of the mobile terminal 200 is not limited to the configurations or the names of components listed above. For example, a battery or the like for supplying power to the mobile terminal 200 may be included in the mobile terminal 200. In this way, the configuration of an electronic device for implementing various embodiments disclosed in the present disclosure may be variously modified and implemented by those skilled in the art. Hereinafter, for convenience of description, each configuration will be described with a focus on functions.

The front camera 210 may include at least one camera. The front camera 210 may include one or more lenses, image sensors, image signal processors, or flashes.

The front camera 210 may capture a front image of the mobile terminal 200.

The inertial measurement sensor 220 may detect an inertial characteristic of the mobile terminal 200 and generate an electrical signal or data value corresponding to the detected state. For example, the inertial measurement sensor 220 may include a gyro sensor and an acceleration sensor. Hereinafter, data measured by the inertial measurement sensor 220 is referred to as inertial sensing data.

The communication module 230 may include one or more modules that enable communication between the mobile terminal 200 and the omnidirectional camera 100 or between the mobile terminal 200 and the server 300. The communication module 230 may include at least one of a mobile communication module, a wireless Internet module, and a short-range communication module. The short-range communication module may perform a communication connection with the omnidirectional camera 100 by wire or wirelessly. For example, the short-range communication module may include a Bluetooth module for short-range wireless communication or an RS232 module for wired communication.

The display module 240 may be implemented as a touch screen by forming a layer structure with a touch sensor or being formed integrally with the touch sensor. Such a touch screen may function as an input unit providing an input interface between the mobile terminal 200 and an input user using the mobile terminal, and may provide an output interface.

The processor 250 may control at least some of the components illustrated in FIG. 3 in order to drive an application program stored in the memory 260, that is, the application. In addition, the processor 250 may operate at least two or more of the components included in the mobile terminal 200 in combination with each other in order to drive the application program. The processor 250 may drive an application by executing instructions stored in the memory 260.

The processor 250 generally controls the overall operation of the mobile terminal 200 in addition to the operation related to the application program. The processor 250 may provide or process appropriate information or a function to a user by processing signals, data, information, and the like, which are input or output through the above-described components, or by driving an application program stored in the memory 260. The processor 250 may be implemented as one processor or a plurality of processors.

As an example, the processor 250 may generate relative location information for an indoor point where the omnidirectional image is acquired using a change in the front image and a variation in the inertial sensing data.

As an example, the processor 250 extracts at least one feature point from the front image, and generates the visual movement information of the mobile terminal based on the change in the extracted feature point of the at least one feature point, in which the visual movement information includes at least one of a movement direction and a movement distance.

As an example, the processor 250 may generate inertial movement information of the mobile terminal by using the variation of the inertial sensing data and the relative location information by verifying the visual movement information based on the inertial movement information, in which the inertial movement information includes at least one of the movement direction and the movement distance.

For example, when outlier data exceeding a preset threshold value including at least one of a threshold value of a change of direction and a threshold value of a moving distance occurs in the visual movement information, the processor 250 may compare data of inertial movement information corresponding to outlier data of the visual movement information with the outlier data to determine whether to apply the outlier data.

A detailed description of the operation of the processor 250 will be described in more detail below with reference to FIGS. 6 to 11. In the following description, the mobile terminal 200 or the processor 250 is expressed as a subject of control, instruction, or function by driving an application, but this means that the processor 250 operates by driving instructions or applications stored in the memory 260.

At least some of the components may operate in cooperation with each other in order to implement an operation, control, or a control method of the mobile terminal according to various embodiments described below. In addition, the operation, control, or control method of the mobile terminal may be implemented on the mobile terminal by driving at least one application program stored in the memory 260.

Figure 4:
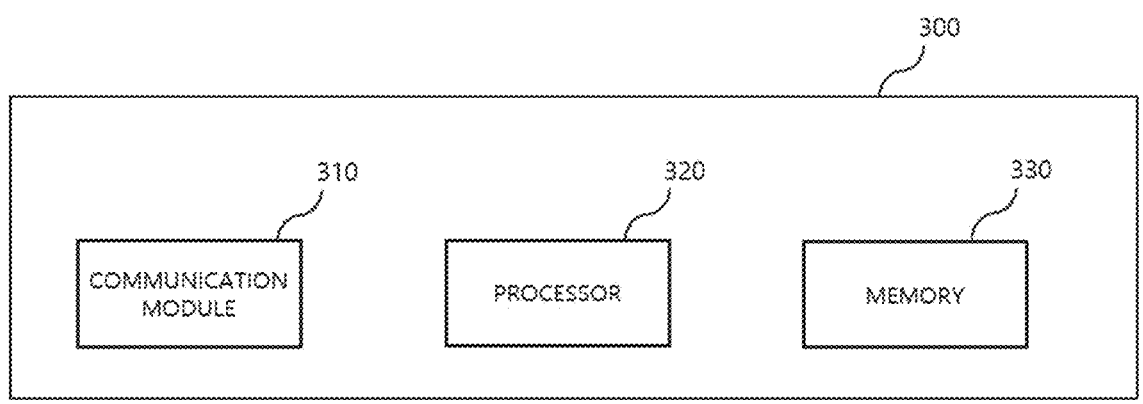
FIG. 4 is a block diagram illustrating a server, in accordance with one or more embodiments.

FIG. 4 is a block diagram for describing a server according to an embodiment disclosed in the present disclosure.

Referring to FIG. 4, the server 300 may include a communication module 310, a processor 320, and a memory 330.

The communication module 310 may include one or more modules that enable communication between the server 300 and the mobile terminal 200 or between the server 300 and the user terminal 400.

The processor 320 is one or a plurality of processors that are operatively connected to the memory and communication module.

The processor 320 may drive a program stored in the memory 330, for example, an operating system and/or a server application.

The processor 320 may drive an application by executing instructions stored in the memory 330.

For example, the processor 320 may receive image data for generating virtual indoor space content from a mobile terminal, the image data including, for each of a plurality of indoor points, an omnidirectional image acquired from each indoor point and relative location information on the indoor point, and generate the virtual indoor space content by mapping a plurality of virtual points corresponding to the plurality of indoor points in a virtual indoor space based on the relative location information.

A detailed description of the processor 320 will be described in more detail below. In the following description, the server 300 or the processor 320 is expressed as a subject of control, instruction, or function by driving an application, but this means that the processor 320 operates by driving instructions or applications stored in the memory 330.

Figure 5:
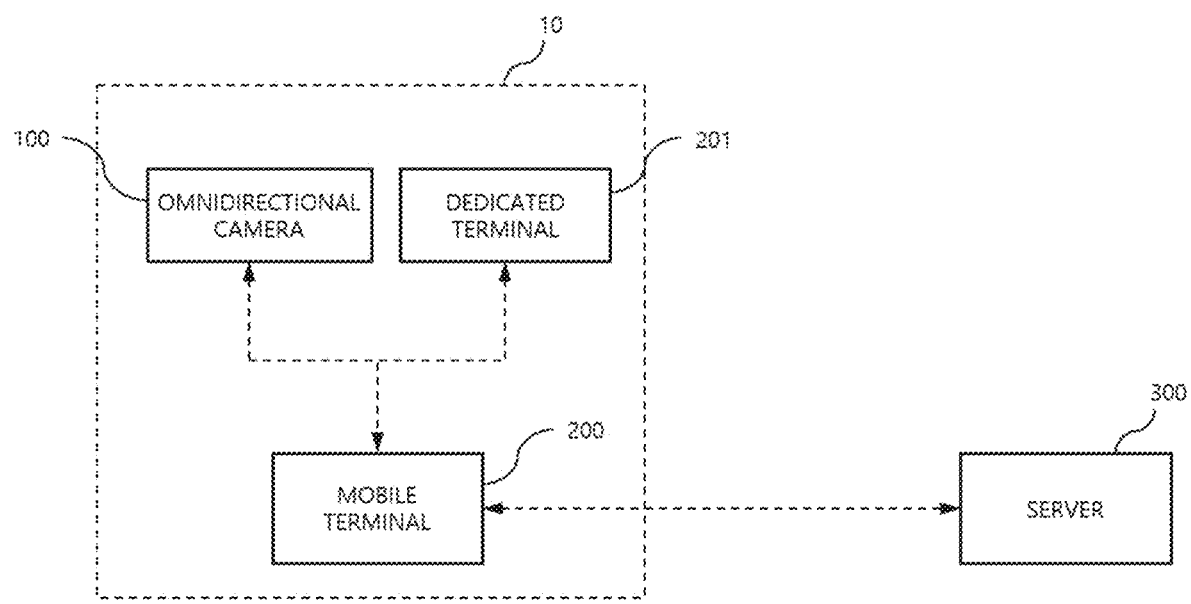
FIG. 5 is a diagram illustrating another example of a system that provides virtual indoor space content corresponding to a real indoor space, in accordance with one or more embodiments.

FIG. 5 is a diagram illustrating another example of a system for providing virtual indoor space content corresponding to a real indoor space, according to an embodiment disclosed in the present disclosure.

In an embodiment illustrated in FIG. 5, the system further includes a dedicated terminal 201. The dedicated terminal 201 is a terminal that performs some functions of the mobile terminal 201 illustrated in FIG. 1, and when the omnidirectional camera 100 acquires an omnidirectional image, the dedicated terminal 201 may generate relative location information. In addition, the dedicated terminal 201 may store the omnidirectional image in association with relative location information on the omnidirectional image, and provide the omnidirectional image to the server 300 through the mobile terminal 200.

The mobile terminal 200 may control the operation of the omnidirectional camera 100 and/or the dedicated terminal 201 according to a manipulation of an inputter. That is, the mobile terminal 200 may provide an interface for an operation to the inputter, and the dedicated terminal 201 may generate relative location information and associate the relative location information with the omnidirectional image.

Hereinafter, an operation and control method of each component of a system providing virtual indoor space content will be described in more detail with reference to FIGS. 6 to 14.

Figure 6:
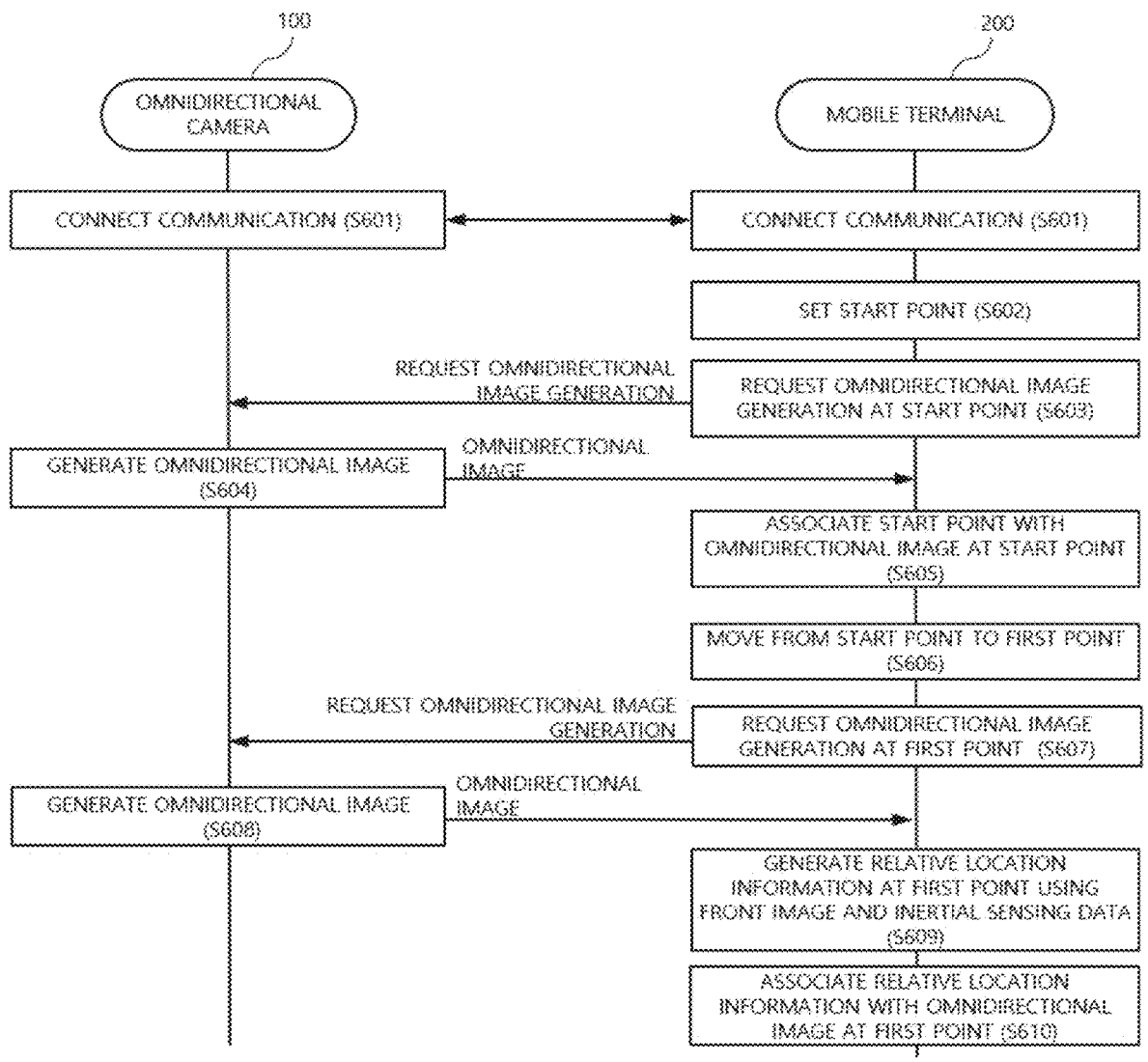
FIG. 6 is a flowchart illustrating a method of controlling a mobile terminal performed in the mobile terminal, in accordance with one or more embodiments.

FIG. 6 is a flowchart for describing a method of controlling a mobile terminal performed in the mobile terminal according to the embodiment disclosed in the present disclosure.

Referring to FIG. 6, the mobile terminal 200, specifically, the processor 250 of the mobile terminal 200, may perform a communication connection with the omnidirectional camera 100 (S601).

The mobile terminal 200 may start capturing at any one point in a real indoor space, which is referred to as a start point. The mobile terminal 200 may set a start point (S602).

As an example, the mobile terminal 200 may display plane information for a real indoor space, and receive a point of the plane information as a start point according to an input of an inputter who operates the mobile terminal 200.

The mobile terminal 200 may request the omnidirectional camera 100 to generate the omnidirectional image for the start point according to the input of the inputter (S603), and the omnidirectional camera 100 may generate the omnidirectional image from the start point and provide the generated omnidirectional image to the mobile terminal 200 (S604).

The mobile terminal 200 may store the start point in association with the omnidirectional image captured at the start point (S605).

The mobile terminal 200 may move from the start point to a first point according to the inputter (S606).

The mobile terminal 200 may request the omnidirectional camera 100 to generate the omnidirectional image for the first point according to the input of the inputter (S607), and the omnidirectional camera 100 may generate the omnidirectional image from the first point and provide the generated omnidirectional image to the mobile terminal 200 (S608).

The mobile terminal 200 may generate relative location information on the first point by using the front image and the inertial sensing data (S609).

The mobile terminal 200 may store the relative location information on the first point in association with the omnidirectional image for the first point (S610). The mobile terminal 200 may associate the omnidirectional image for the first point and the relative location information for the first point and provide the omnidirectional image and relative location information to the server as image data.

FIG. 6 illustrates the operation of the mobile terminal 200 for the start point and the first point after the start point, but the mobile terminal 200 is not limited thereto, and may continuously generate relative location information for each successive point after the first point, and generate and associate the omnidirectional images for the relative location information.

In an embodiment, the mobile terminal 200 may set a path by reflecting the relative location information of the plane information. The mobile terminal 200 may receive any one point of the plane information as a start point according to the input of the inputter, and receive another point of the plane information as a first point according to the input of the inputter after the mobile terminal moves. The mobile terminal 200 may set a path from the start point to the first point of the plane information by reflecting the relative location information from the start point to the first point of the plane information.

Figure 11:
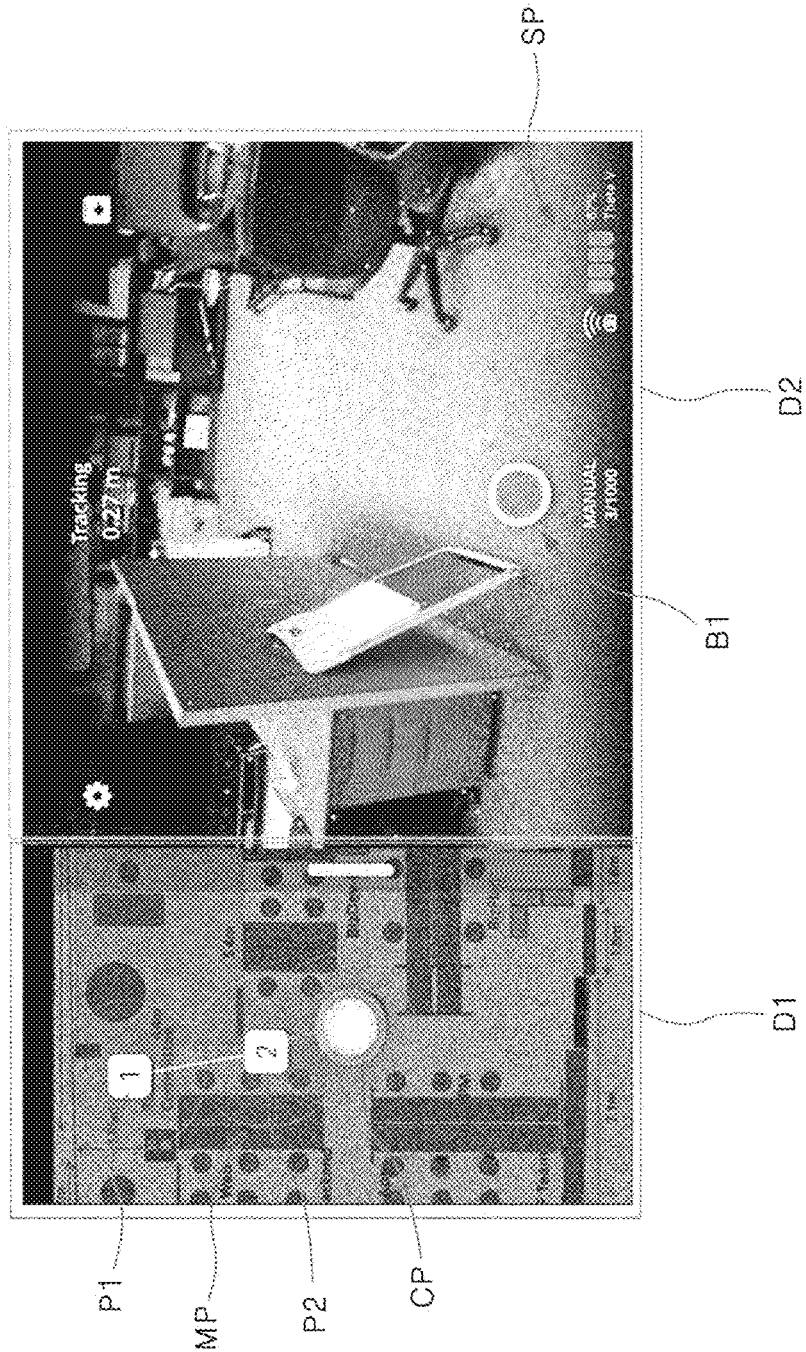
FIG. 11 is a diagram illustrating an example of path setting in the mobile terminal, in accordance with one or more embodiments.

FIG. 11 is a diagram illustrating an example of path setting in the mobile terminal according to the embodiment disclosed in the present disclosure. Referring to FIG. 11, the mobile terminal 200 may display relative location information from a first point P1 to a second point P2 of plane information D1 to display a path MP. In addition, the mobile terminal 200 may display a current point CP of the plane information D1, and may display a front image acquired from a current location of plane information D2. At least one feature point SP may be displayed on the front image.

In an embodiment, the mobile terminal 200 may reflect a progress direction of the relative location information with respect to the start point and the first point of the plane information. That is, the relative location information is prepared based on the front of the mobile terminal 200, but the start point and the first point may be used to set which direction of the plane information is the front of the mobile terminal 200. The mobile terminal 200 displays plane information for a real indoor space, and receives any one point of the plane information as a start point according to an input of an inputter. After the mobile terminal moves from the start point, the mobile terminal 200 receives another point of the plane information as the first point according to the input of the inputter. The mobile terminal 200 may reflect the relative location information from the start point to the first point of the plane information to match the progress direction of the plane information with the progress direction of the relative location information.

Figure 10:
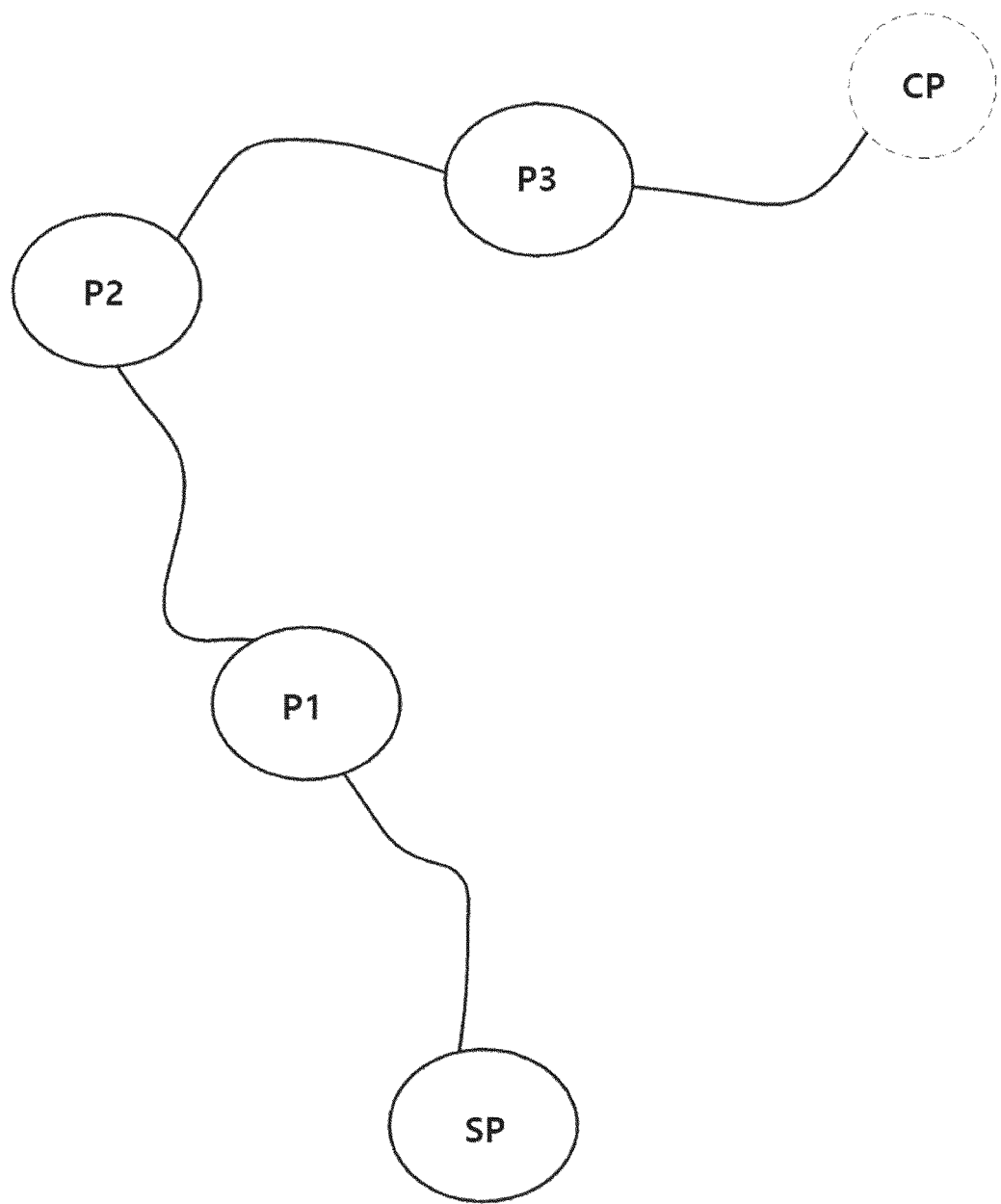
FIG. 10 is a diagram illustrating the setting of a movement path, in accordance with one or more embodiments.

FIG. 10 is a view for describing setting of a movement path according to an embodiment disclosed in the present disclosure, and each point of plane information is displayed. When a user sets the start point SP and the first point P1 of the plane information, the mobile terminal 200 reflects the relative location information from the start point to the first point of the plane information to match the progress direction of the plane information with the progress direction of the relative location information. Thereafter, the mobile terminal 200 may display the second point P2, a third point P3, and a current point CP of the plane information by displaying the relative location information between the respective points.

Figure 7:
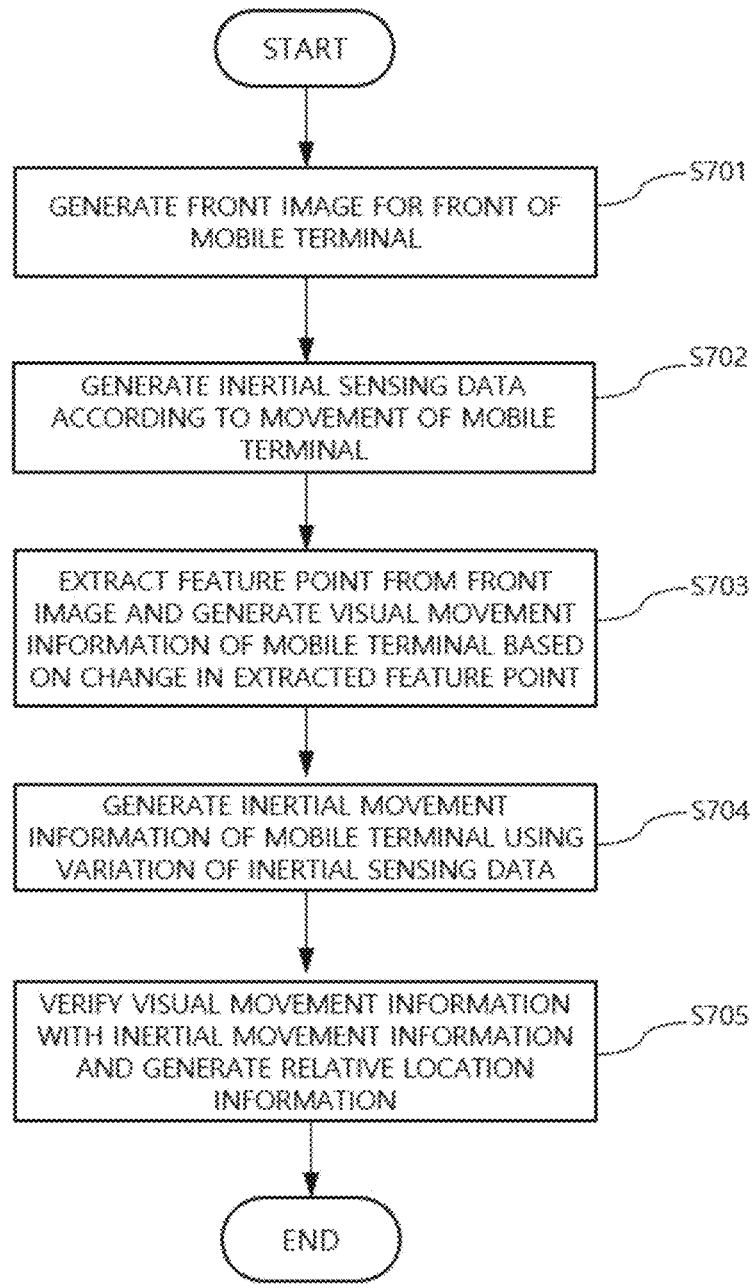
FIG. 7 is a flowchart illustrating the generation of relative location information performed in the mobile terminal, in accordance with one or more embodiments.

FIG. 7 is a flowchart for describing the generation of the relative location information performed in the mobile terminal according to the embodiment disclosed in the present disclosure. Hereinafter, the mobile terminal 200 will be described with further reference to FIG. 7.

The mobile terminal 200 may generate a front image for a front of the mobile terminal (S701), and generate inertial sensing data according to the movement of the mobile terminal 200 (S702). The generation of the front image and the generation of the inertial sensing data may be continuously or at least partially performed while the mobile terminal performs an operation to control generation of an omnidirectional image.

The mobile terminal 200 may extract at least one feature point from the front image and generate visual movement information of the mobile terminal based on a change in at least one extracted feature point. Here, the visual movement information is movement information derived based on the front image, and includes at least one of a movement direction and a movement distance.

Figure 8A:
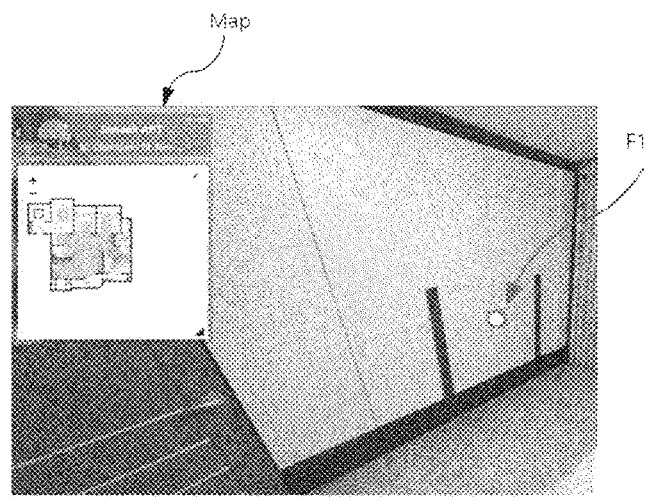
FIG. 8A and FIG. 8B are diagrams illustrating visual movement information, in accordance with one or more embodiments.
Figure 8B:
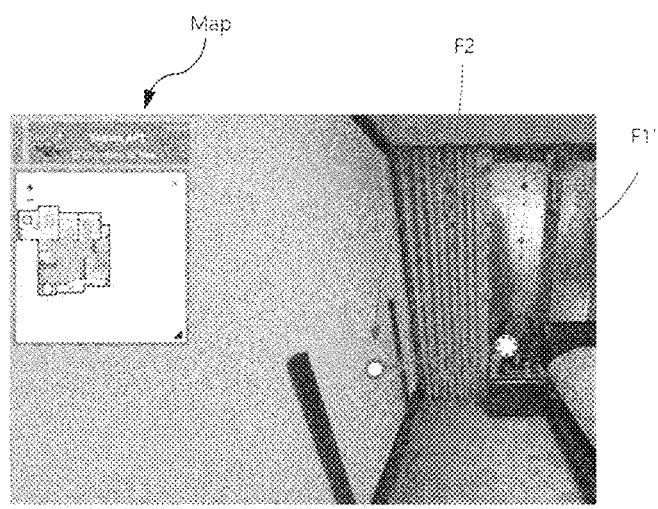

FIG. 8A and FIG. 8B are diagrams illustrating visual movement information according to an embodiment disclosed in the present disclosure. Referring further to FIG. 8A and FIG. 8B, FIG. 8A is an example of a front image from a first time point, and FIG. 8B illustrates a front image at the second time point when a predetermined time has elapsed from the first time point.

In FIG. 8A, the mobile terminal 200 extracts a feature point F1, and in FIG. 8B, the mobile terminal 200 extracts a feature point F2 corresponding to the feature point F1. A feature point F1' in FIG. 8B is a position corresponding to a position of the feature point F1 in FIG. 8A. Therefore, the feature point F1 in FIG. 8A has a movement displacement of $\Delta F1$ and becomes the feature point F1' in FIG. 8B. Accordingly, the mobile terminal 200 may estimate a movement displacement of a camera, that is, a movement direction and a movement distance, by using the movement displacement $\Delta F1$ of the feature point, and may generate the estimated movement direction and movement distance as visual movement information.

Referring back to FIG. 7, the mobile terminal 200 may generate inertial movement information of the mobile terminal by using variation of inertial sensing data (S704). For example, the mobile terminal 200 may estimate the movement direction and movement distance of the mobile terminal by using sensing data of a gyro sensor and/or sensing data of a 3-axis acceleration sensor, and may generate inertial movement information using information on the estimated movement direction and movement distance.

In an embodiment, the visual movement information may be information stored in association with the movement direction and movement distance set for each unit time point. For example, the visual movement information may be a set of information related to the movement direction and movement distance calculated based on each unit time point. The inertial movement information may also be generated for each unit time point.

The mobile terminal 200 may generate the relative location information by verifying the visual movement information based on the inertial movement information (S705).

In an embodiment, the mobile terminal 200 may set the relative location information based on the visual movement information, and when an outlier having a numerical change of more than a certain level occurs in the visual movement information, may verify the outlier with the inertial movement information.

Figure 9A:
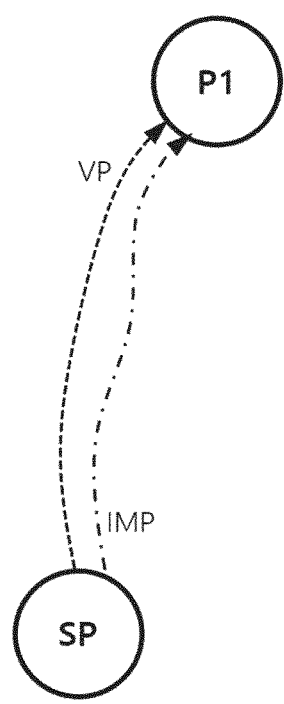
FIGS. 9A and 9B are diagrams illustrating relative location information, in accordance with one or more embodiments.
Figure 9B:
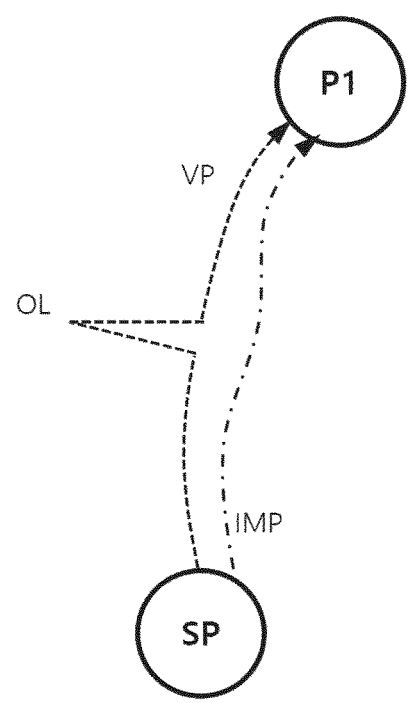

FIG. 9A and FIG. 9B are diagrams illustrating the relative location information according to the embodiment disclosed in the present disclosure, which will be further described with reference to FIG. 9A and FIG. 9B.

FIG. 9A and FIG. 9B illustrate visual movement information VP and inertial movement information IMP from a start point SP to the first point P1 on a plane.

In FIG. 9A, the visual movement information VP has no outlier, and is at least partially different from the inertial movement information IMP, but has a similarity within a critical range.

On the other hand, in FIG. 9B, when outlier data OL exceeding a preset threshold value including at least one of a threshold value of a change of direction and a threshold value of a moving distance occurs in the visual movement information VP, the mobile terminal 200 may compare data of inertial movement information corresponding to outlier data of the visual movement information with the outlier data to determine whether to apply the outlier data. That is, the mobile terminal 200 has no change corresponding to the outlier in the inertial movement information IMP corresponding to the outlier data OL of the visual movement information when compared with the inertial movement information IMP in FIG. 9B, and as a result, may not apply the outlier data OL.

As described above, since the mobile terminal 200 verifies the outlier for the visual movement information by using the inertial movement information, it is possible to prevent a temporary error occurring in the visual movement information.

Hereinafter, an operation of the server 300 will be described with reference to FIGS. 12 to 14.

Figure 12:
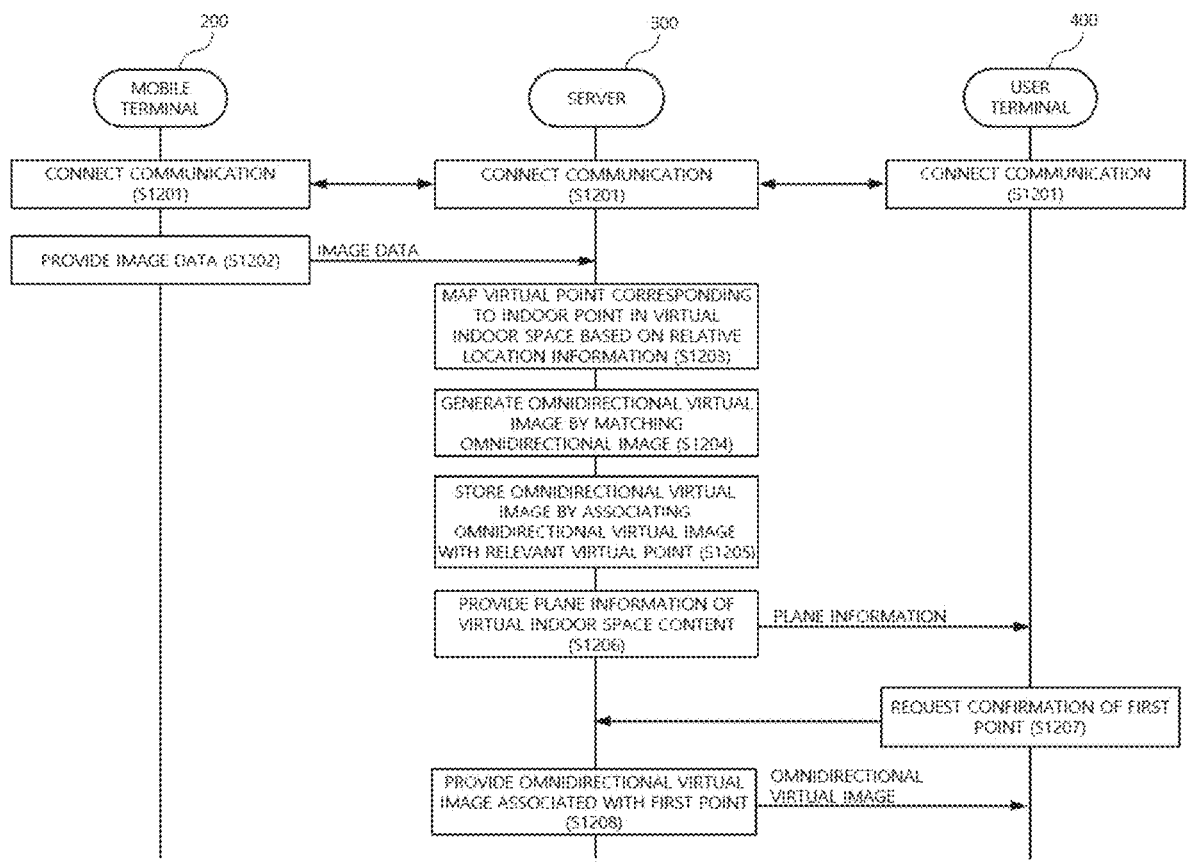
FIG. 12 is a flowchart illustrating a method of providing virtual indoor space content performed by a server, in accordance with one or more embodiments.

FIG. 12 is a flowchart for describing a method of providing virtual indoor space content performed by a server according to an embodiment disclosed in the present disclosure.

Referring to FIG. 12, the server 300 may establish a communication connection with the mobile terminal 200 through the communication module (S1201). The server 300 may also establish a communication connection to a user terminal 400 experiencing virtual indoor space content (S1201).

The server 300 receives image data for generating virtual indoor space content from the mobile terminal 200 (S1202). Here, the image data includes, for each of a plurality of indoor points, an omnidirectional image acquired from each indoor point and relative location information for the corresponding indoor point.

The server 300 may generate virtual indoor space content by mapping a plurality of virtual points corresponding to a plurality of indoor points in the virtual indoor space based on the relative location information (S1203 to S1205).

That is, the server 300 may map the plurality of virtual points corresponding to the plurality of indoor points in the virtual indoor space based on the relative location information (S1203).

The server 300 may generate an omnidirectional virtual image by matching the omnidirectional images (S1204). The omnidirectional image includes a plurality of images captured at different angles at one point, and the server 300 may generate an omnidirectional virtual image that can be confirmed in all directions by matching a plurality of images based on features common to each other in the plurality of images. That is, the matching may be performed so that portions captured from both adjacent images are merged. To this end, the server 300 may extract feature points from each of the plurality of images, and stitch the feature points that are the same or have a certain degree of similarity in two adjacent images to match the two images. By performing the matching on all of the plurality of images, the server 300 may generate an omnidirectional virtual image that can be confirmed in all directions, that is, 360 degrees left and right and 180 degrees up and down, based on a capturing point.

The server 300 may store the generated omnidirectional virtual image in association with a virtual point corresponding to the indoor point where the corresponding omnidirectional image is acquired (S1205).

The server 300 may provide the generated virtual indoor space content to the user terminal 400. As the virtual indoor space content, the server 300 may provide plane information on virtual indoor space content corresponding to the real indoor space to the user terminal 400 (S1206).

Here, the plane information may include a plurality of virtual points mapped to each of a plurality of indoor points.

The user may select any one of a plurality of virtual points and request an omnidirectional virtual image for the corresponding point (S1207).

Upon receiving a request for any one of a plurality of virtual points from the user terminal 400, the server 300 may provide the omnidirectional virtual image associated with the virtual point to the user terminal 400.

It has been described above that the relative location information is generated by the user terminal 200, but according to an embodiment, the relative location information may be generated by the server 300. FIG. 13 is a flowchart for describing the generation of the relative location information performed in the server according to the embodiment disclosed in the present disclosure.

Figure 13:
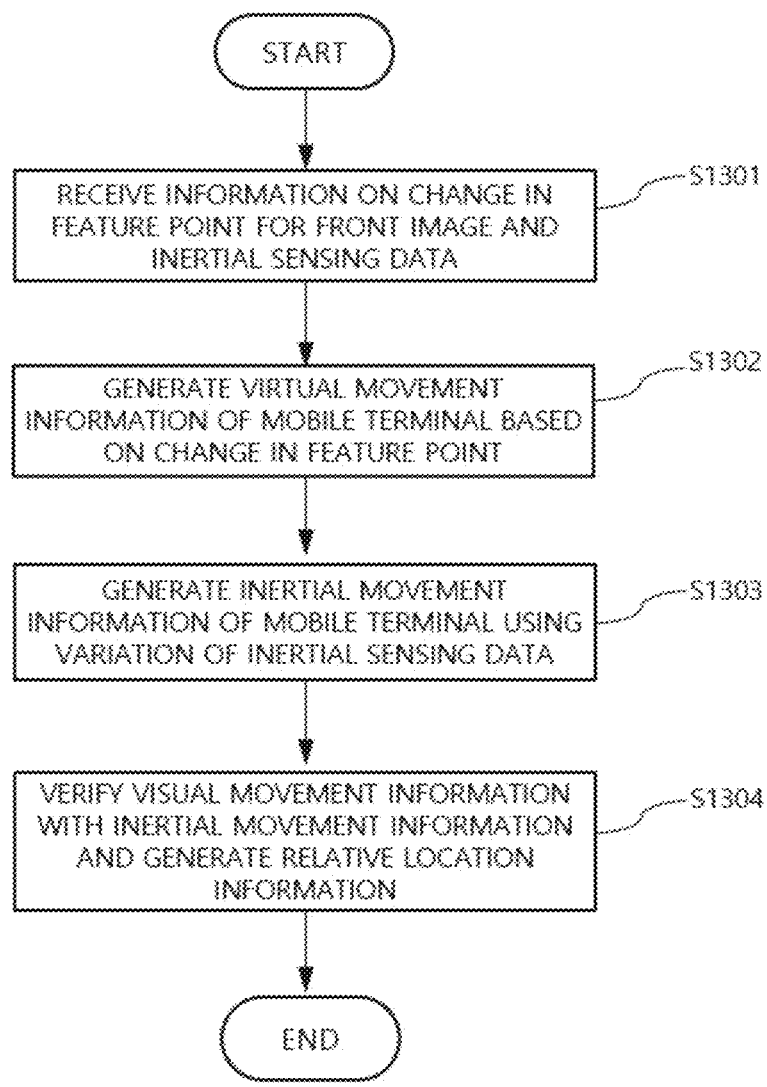
FIG. 13 is a flowchart illustrating the generation of relative location information performed in a server, in accordance with one or more embodiments.

Referring to FIG. 13, the server 300 may receive, from the user terminal 200, information on a change in feature point for the front image and the inertia sensing data (S1301). According to an embodiment, the user terminal 200 may provide the front image and the inertial sensing data, and the server 300 may directly generate the information on the change in the feature point for the front image.

The server 300 may generate the visual movement information of the mobile terminal 200 based on the change in the feature point (S1302), and may generate the inertial movement information of the mobile terminal 200 using the variation of the inertial sensing data (S1303). The server 300 may generate the relative location information based on the visual movement information, or may generate the relative location information by verifying the visual movement information with the inertial movement information (S1304). A detailed description thereof may be understood with reference to the above description with reference to FIG. 7 and the like.

Figure 14:
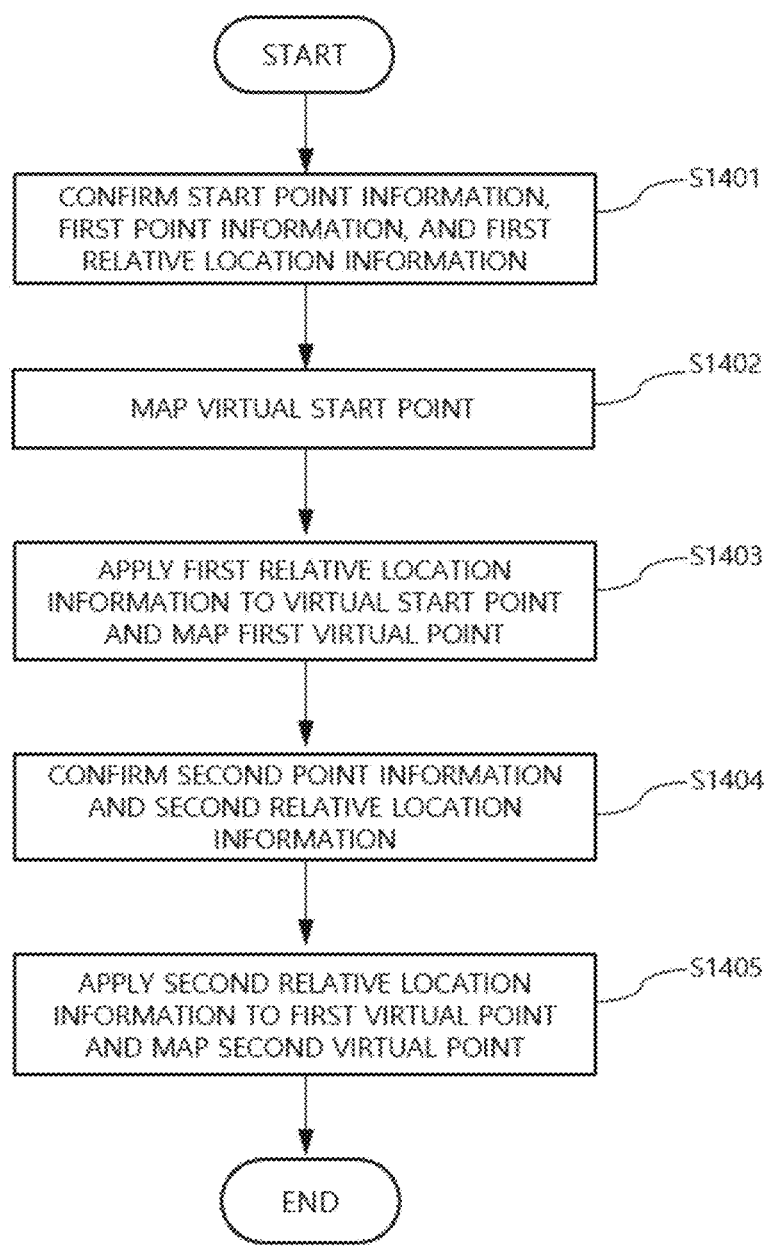
FIG. 14 is a flowchart illustrating virtual point mapping performed in a server, in accordance with one or more embodiments Throughout the drawings and the detailed description, the same reference numerals may refer to the same, or like, elements. The drawings may not be to scale, and the relative size, proportions, and depiction of elements in the drawings may be exaggerated for clarity, illustration, and convenience

FIG. 14 is a flowchart illustrating the virtual point mapping performed in the server according to the embodiment disclosed in the present disclosure, and the virtual point mapping will be described with reference to FIG. 14.

The server 300 may confirm start point information on a start point, first point information on a first point after the start point, and first relative location information on the first point that are included in the image data (S1401). As an example, the start point information and the first point information may be set as, for example, coordinate information of the plane information using plane information of an indoor space.

The server 300 may map the virtual start point corresponding to the start point of the plane information (S1402), and apply the first relative location information to the virtual start point to map the first virtual point corresponding to the first point (S1403). The server 300 may perform verification by comparing the first virtual point with the first point information.

The server 300 may further confirm second point information of a second point after the first point and second relative location information of the second point that are included in the image data. The server 300 may map the second virtual point corresponding to the second point by applying the second relative location information to the first virtual point in the plane information corresponding to the real indoor space (S1405). The server 300 may perform verification by comparing the second virtual point with the second point information.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A server that provides virtual indoor space content corresponding to a real indoor space, the server comprising:
a memory;
a communication module; and
at least one processor operatively connected to the memory and the communication module,
wherein the at least one processor receives image data to generate the virtual indoor space content from a mobile terminal through the communication module, the image data including, for each of a plurality of indoor points, an omnidirectional image acquired from each indoor point and relative location information on the indoor point including a relative movement path from a previous indoor point to the indoor point, and generates the virtual indoor space content by mapping a plurality of virtual points corresponding to the plurality of indoor points in a virtual indoor space based on the relative location information, wherein the at least one processor generates the relative location information by verifying a visual movement information obtained using an inertial movement information.

2. The server of claim 1, wherein the at least one processor confirms information that are included in the image data, wherein the information that are included in the image data comprises start point information on a start point, first point information on a first point subsequent to the start point, and first relative location information on the first point, and maps a first virtual point corresponding to the first point by mapping a virtual start point corresponding to the start point of plane information corresponding to the real indoor space, and applying the first relative location information to the virtual start point.

3. The server of claim 2, wherein the at least one processor further confirms second point information on a second point after the first point and second relative location information on the second point that are included in the image data, and maps a second virtual point corresponding to the second point by applying the second relative location information to the first virtual point of the plane information corresponding to the real indoor space.

4. The server of claim 1, wherein the omnidirectional image includes a plurality of partial images captured based on different angles, and wherein the at least one processor generates an omnidirectional virtual image confirmed in all directions by matching the plurality of partial images based on a feature that the plurality of partial images have in common with each other.

5. The server of claim 4, wherein the at least one processor stores the omnidirectional virtual image in association with a virtual point corresponding to an indoor point where the omnidirectional image is acquired.

6. The server of claim 4, wherein the at least one processor provides plane information on virtual indoor space content corresponding to the real indoor space to a user terminal through the communication module, and the plane information includes a plurality of virtual points mapped to each of the plurality of indoor points.

7. The server of claim 6, wherein, when the at least one processor receives a request for any one of the plurality of virtual points from the user terminal through the communication module, the at least one processor provides the omnidirectional virtual image associated with the virtual point to the user terminal.

8. A method of providing virtual indoor space content performed in a server that services virtual indoor space content corresponding to a real indoor space, the method comprising:

receiving, from a mobile terminal, image data to generate virtual indoor space content corresponding to a real indoor space, the image data including, for each of a plurality of indoor points, an omnidirectional image acquired from each indoor point and relative location information on the indoor point including a relative movement path from a previous indoor point to the indoor point; and generating the virtual indoor space content by mapping a plurality of virtual points corresponding to the plurality of indoor points in a virtual indoor space based on the relative location information, wherein the relative location information is generated by verifying a visual movement information obtained using an inertial movement information.

9. The method of claim 8, wherein the generating of the virtual indoor space content includes:

confirming information that are included in the image data, wherein the information that are included in the image data comprises start point information on a start point, first point information on a first point subsequent to the start point, and first relative location information on the first point; and mapping a first virtual point corresponding to the first point by mapping a virtual start point corresponding to the start point of plane information corresponding to the real indoor space, and applying the first relative location information to the virtual start point.

10. The method of claim 9, wherein the generating of the virtual indoor space content further includes:

further confirming second point information on a second point after the first point and second relative location information on the second point that are included in the image data; and mapping a second virtual point corresponding to the second point by applying the second relative location information to the first virtual point of the plane information corresponding to the real indoor space.

11. The method of claim 8, wherein the omnidirectional image includes a plurality of partial images captured based on different angles, and wherein the generating of the virtual indoor space content includes:

generating an omnidirectional virtual image confirmed in all directions by matching the plurality of partial images based on a feature that the plurality of partial images have in common with each other; and storing the omnidirectional virtual image in association with a virtual point corresponding to an indoor point where the omnidirectional image is acquired.

12. The method of claim 8, further comprising:

providing, through a communication module, plane information on virtual indoor space content corresponding to the real indoor space to a user terminal, the plane information including a plurality of virtual points mapped to each of the plurality of indoor points; and upon receiving a request for any one of the plurality of virtual points from the user terminal, providing the omnidirectional virtual image associated with the virtual point to the user terminal.

13. A non-transitory computer-readable storage medium storing instructions that, when executed by a processor, causes the processor to:

receive, from a mobile terminal, image data to generate virtual indoor space content corresponding to a real indoor space, the image data including, for each of a plurality of indoor points, an omnidirectional image acquired from each indoor point and relative location information on the indoor point including a relative movement path from a previous indoor point to the indoor point; and generate the virtual indoor space content by mapping a plurality of virtual points corresponding to the plurality of indoor points in a virtual indoor space based on the relative location information, wherein the relative location information is generated by verifying a visual movement information obtained using an inertial movement information.

* * * * *